United States Patent [19]

Gardner

[11] Patent Number: 5,332,787

[45] Date of Patent: Jul. 26, 1994

[54] VULCANIZATION PROCESS USING BASIC ZINC CARBONATE HYDROXIDE

[75] Inventor: Irwin J. Gardner, Scotch Plains, N.J.

[73] Assignee: Exxon Chemical Patents Inc., Linden, N.J.

[21] Appl. No.: 983,114

[22] Filed: Nov. 30, 1992

Related U.S. Application Data

[63] Continuation of Ser. No. 753,489, Sep. 3, 1991, abandoned.

[51] Int. Cl.$^5$ ............... C08L 25/16; C08L 23/28; C08F 8/34; C08F 8/18
[52] U.S. Cl. .................. 525/134; 525/333.4; 525/333.5; 525/352
[58] Field of Search ............ 525/333.3, 333.4, 333.5, 525/352, 134, 135, 144, 145

[56] References Cited

U.S. PATENT DOCUMENTS

| | | | |
|---|---|---|---|
| 2,955,102 | 10/1960 | Clayton | 525/352 |
| 2,974,117 | 3/1961 | Dunkel | 525/352 |
| 3,033,838 | 5/1962 | Ray | |
| 4,165,416 | 8/1979 | Matoba et al. | 525/346 |
| 5,077,345 | 12/1991 | Newman | 525/333.3 |

FOREIGN PATENT DOCUMENTS

| | | |
|---|---|---|
| 2721016 | 9/1978 | Fed. Rep. of Germany |
| 78036 | 6/1980 | Japan |

*Primary Examiner*—Christopher Henderson
*Attorney, Agent, or Firm*—Myron B. Kurtzman; M. L. Gibbons; J. E. Schneider

[57] ABSTRACT

A process is provided for vulcanizing a halogen-containing copolymer of a $C_4$ to $C_7$ isomonoolefin and a para-alkylstyrene utilizing a vulcanization mixture comprising a basic zinc carbonate hydroxide.

11 Claims, No Drawings

VULCANIZATION PROCESS USING BASIC ZINC CARBONATE HYDROXIDE

This is a continuation of application Ser. No. 753,489, filed Sep. 3, 1991, now abandoned.

BACKGROUND OF THE INVENTION

1. Field of the Invention

The present invention relates to a vulcanization process for a halogen-containing copolymer.

2. Description of Information Disclosures

The use of zinc oxide with other vulcanization agents or vulcanization modifiers for the vulcanization of halogen-containing elastomers is known. See, for example, U.S. Pat. No. 3,033,838 which discloses that halogen-containing butyl type rubbers are vulcanizable with zinc oxide.

It has now been found that the use of specified basic zinc salts in combination with certain vulcanization agents and/or vulcanization modifiers in a process for the vulcanization of specified halogen-containing polymers improves the scorch resistance of the polymers and permits better cure control than zinc oxide used in combination with the same vulcanization agents or modifiers.

SUMMARY OF THE INVENTION

In accordance with the invention, there is provided a process for vulcanizing a halogen-containing copolymer of a $C_4$ to $C_7$ isomonoolefin and a para-alkylstyrene, which comprises the step of contacting said copolymer at vulcanization conditions with a vulcanization mixture comprising (a) a basic zinc carbonate hydroxide, and (b) a component selected from the group consisting of a dialkyldithiocarbamate, a diaryldithiocarbamate, an alkyl thiuram sulfide, an aryl thiuram sulfide, a phenol-formaldehyde resin and mixtures thereof.

DETAILED DESCRIPTION OF THE INVENTION

The vulcanization mixture suitable for use to vulcanize the halogen-containing copolymer of a $C_4$ to $C_7$ isomonoolefin and a para-alkylstyrene comprises (a) a basic zinc carbonate hydroxide and (b) a component which may be a vulcanization agent or vulcanization modifier selected from the group consisting of dialkyldithiocarbamate, diarylthiocarbamate, an alkyl thiuram sulfide, a phenol formaldehyde resin and mixtures thereof.

Preferably, zinc oxide is excluded from the vulcanization mixture.

Suitable basic zinc carbonate hydroxides include: 5 $ZnO.2CO_3.4H_2O$; $Zn\,CO_3.2\,Zn(OH)_2.H_2O$; $2\,ZnCO_3.3\,Zn(OH)_2$ ("Hytrozincite") and mixtures thereof. The preferred basic zinc carbonate hydroxide is 5 $ZnO.2CO_3.4H_2O$.

Suitable dialkyldithiocarbamates include the dialkyldithiocarbamates of zinc, bismuth, cadmium, copper, lead, selenium, and tellurium wherein the alkyl group contains from 1 to 5 carbon atoms, piperidinium pentamethylenedithiocarbamate and mixtures thereof.

Suitable diarylthiocarbamates include the diaryldithiocarbamates of zinc, bismuth, cadmium, copper, lead, selenium, tellurium, and mixtures thereof.

Suitable alkyl thiuram sulfides include dipentamethylene thiuram tetrasulfide, tetrabutylthiuram disulfide, tetraethylthiuram disulfide, tetramethylthiuram monosulfide, tetrabenzyl thiuram disulfide, and mixtures thereof.

Suitable phenol-formaldehyde resins include those comprising phenolmethylol groups and their halogenated derivatives. The generalized structure of the resin has been suggested as:

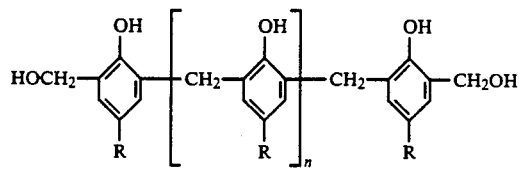

wherein R is an alkyl, aryl or alkenyl hydrocarbon containing 4 to 16 carbon atoms and n is about 0 to about 50; typically, the methylol groups are present at about 6 to about 12 weight percent. For the halogen-containing polymer of the present invention, a halogen activator is not required.

Halogenated resins in which some of the hydroxyl groups of the methylol group are replaced with, e.g., bromine, are more reactive.

The term "halogenated (phenol aldehyde) resin" as used herein is intended to mean both monomeric and polymeric halomethyl hydrocarbon-substituted phenols. The monomeric form of these curing agents falls under the general formula:

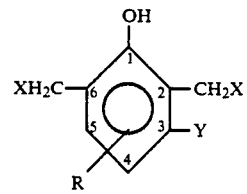

wherein R is an alkyl, aryl or alkenyl hydrocarbon containing 4 to 16 carbon atoms located in the meta or para positions (4-5 positions), X is a halogen such as fluorine, chlorine, bromine or iodine, and Y is hydrogen or hydroxy.

Products obtained by the controlled halogenation of methylol-containing resins prepared by the condensation of an aldehyde, e.g., formaldehyde, with the following representative phenols: 4-tertiarybutyl phenol, 4-phenyl phenol and 4-monoxy phenol, are within the purview of the halogenated phenol aldehyde resins suitable for use in this invention. These halomethyl hydrocarbons substituted phenol compounds and their preparation are fully described in U.S. Pat. Nos. 3,093,613 and 3,165,496 which are incorporated herein by reference.

Preferably, the halogenated phenol aldehyde resin is a bromomethyl alkylated phenol aldehyde resin having a methylol content of about 9-14% and a bromine content of about 3-9%. Illustrative of the halogenated phenol aldehyde resins are those prepared by Schenectady Chemicals, Inc. and identified as resins SP 1055 ® and Sp 1056 ®. Such resins are heat reactive bromomethyl alkylated phenolic resins with a melting point of about 125° F. (51.67° C.). The SP 1055 resin has a methylol content of about 9 to about 12.5% and a bromine content of about 4%, whereas the SP 1056 resin has a methylol content of about 7.5 to about 11% and a bromine content of about 6%. Commercial forms of the nonhalogenated resins are available such as SP-1044 ® with a methylol content of about 7 to about 9.5% and Sp-1045 ® with a methylol content of about 8 to about 11%.

Optionally, additional vulcanization modifiers may be present in the vulcanization zone of the vulcanization process of the present invention. A preferred additional modifier is triethylene glycol.

The basic zinc carbonate hydroxide may suitably be present in the vulcanization zone in a molar ratio of basic zinc carbonate hydroxide to said halogen-containing copolymer ranging from about 0.05:1 to about 3:1, preferably from about 0.1:1 to about 1:1.

The amount of component (b) in the vulcanization zone may vary widely and may range from about 0.5 to about 10 parts by weight per hundred parts of rubber (phr).

The vulcanization process may be conducted at a temperature ranging from about 100° C. to about 250° C., preferably at a temperature ranging from about 130° C. to about 200° C. for a period ranging typically from about 1 minute to several hours in conventional vulcanization equipment. The pressure is not critical and may vary widely.

Suitable halogen-containing copolymers of a $C_4$ to $C_7$ isomonoolefin and a para-alkylstyrene for use as feed for the vulcanization process of the present invention comprise at least 0.5 weight percent of the para-alkylstyrene moiety. For elastomeric copolymer products, the para-alkylstyrene moiety may range from about 0.5 weight percent to about 20 weight percent, preferably from about 1 to about 20 weight percent, more preferably from about 2 to about 20 weight percent of the copolymer. The halogen content of the copolymers may range from an effective amount above zero to about 7.5 weight percent, preferably from about 0.01 to about 7.5 weight percent, more preferably from about 0.1 to about 7.5 weight percent. The halogen may be bromine, chlorine, and mixtures thereof. Preferably, the halogen is bromine. The major portion of the halogen is chemically bound to the alkyl group in the para position of the para-alkylstyrene, that is, the halogen-containing copolymer comprises para-halo alkyl groups.

The copolymers of the isomonoolefin and para-alkylstyrene useful to prepare the halogen-containing copolymers suitable as feed to the vulcanization process of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises paramethylstyrene. Suitable copolymers of an isomonoolefin and a para-alkyl styrene include copolymers having a number average molecular weight ($\overline{Mn}$) of at least about 25,000, preferably at least about 30,000, more preferably at least about 100,000. The copolymers also, preferably, have a ratio of weight average molecular weight ($\overline{Mw}$) to number average molecular weight ($\overline{Mn}$), i.e., $\overline{Mw}/\overline{Mn}$ of less than about 6, preferably less than about 4, more preferably less than about 2.5, most preferably less than about 2. The brominated copolymer of the isoolefin and para-alkylstyrene obtained by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction, the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

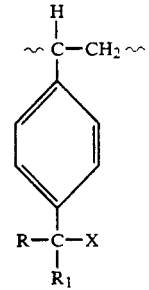

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methyl styryl moiety in the useful copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable paramethylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer hydrogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azo bis isobutyronitrile (AIBN), azo bis (2,4-dimethyl-valero) nitrile, azo bis (2-methyl-butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene is highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO® 52: 2,2'-azobis(2,4-dimethylpentane nitrile), at about 55° to 80° C., for a time period ranging from about 4.5 to about 30 minutes, followed by a caustic quench. The recovered polymer is washed in basic water wash and water/isopropanol washes, recovered, stabilized and dried.

The following examples are presented to illustrate the invention.

EXAMPLE

Various compositions were subjected to vulcanization at a temperature of 160° C. The copolymer subjected to vulcanization, herein designated Copolymer A, was a halogenated copolymer of isobutylene and para-methylstyrene containing 1.1 wt.% bromine and 0.6 mole % para-methylstyrene derived moieties. The vulcanization mixtures used and the resulting properties are summarized in Table I. The parts shown in the Table are parts by weight per hundred parts of rubber (phr). As can be seen from Table I, Compositions 1, 2, 3, 4, 6, 8 and 10, which were compositions accordance with the present invention, had greater scorch resistance, as shown by Mooney Scorch and Rheometer tests, compared to compositions 5, 7, 9 and 11, which were compositions not in accordance with the present invention. Improved scorch resistance is indicated by $t_3$, $t_5$ and $t_{10}$ values greater than those of the comparative compositions. An advantage of the vulcanization mixture of the present invention is that it does not interfere with the full development of tensile properties.

Table II shows the percentage change relative to the ZnO control compositions. Aging was carried out for 168 hours at 150° C. in a circulating air oven. As shown in Table I, significant retardation of cure was achieved with the zinc carbonate hydroxide-containing compositions of the present invention. The 1.5 phr level of zinc carbonate hydroxide was equivalent to 1 phr ZnO.

The test methods used in the Example are shown in Table III.

TABLE I

| Composition, phr | 1 | 2 | 3 | 4 | 5 | 6 | 7 | 8 | 9 | 10 | 11 |
|---|---|---|---|---|---|---|---|---|---|---|---|
| Copolymer A | 100 | 100 | 100 | 100 | 100 | 100 | 100 | 100 | 100 | 100 | 100 |
| Carbon Black N660 | 60 | 60 | 60 | 60 | 60 | 60 | 60 | 60 | 60 | 60 | 60 |
| Stearic Acid | 2 | 2 | 2 | 2 | 2 | 2 | 2 | 2 | 2 | 2 | 2 |
| SP 1045[1] | | | | | | 2 | 2 | | | | |
| Vultac 5[2] | | | | | | | | 2 | 2 | | |
| Tetrone A[3] | 1.0 | 1.0 | 1.0 | 1.0 | 1.0 | | | | | | |
| ZDEDC[4] | | | | | | | | | | 2.0 | 2.0 |
| $Zn(CO_3)(OH)$[5] | 3.0 | 3.0 | 5.0 | 1.5 | | 3.0 | | 3.0 | | 3.0 | |
| ZnO | | | | | 1.0 | | 1.0 | | 1.0 | | 1.0 |
| TEG[6] | | 2 | | | | | | | | | |
| Mooney Scorch @ 135° C. | | | | | | | | | | | |
| $t_3$, min | 7.2 | 13.0 | 8.2 | 5.9 | 4.5 | >30 | 9.0 | 5.9 | 10.0 | 7.1 | 3.7 |
| $t_5$, min | 8.0 | 15.3 | 10.0 | 6.4 | 5.0 | | 14.0 | 6.9 | 11.6 | 8.1 | 4.2 |
| $t_{10}$, min | 9.6 | 18.8 | 11.5 | 7.4 | 5.4 | | 34.5 | 8.1 | 13.7 | 9.6 | 4.9 |
| Rheometer 30' @ 160° C., 3° arc, no Preheat | | | | | | | | | | | |
| $M_H$, lbf-in | 49.3 | 31.0 | 47.3 | 49.0 | 53.0 | 20.8 | 37.2 | 40.0 | 45.2 | 46.3 | 49.7 |
| $M_L$, lbf-in | 13.0 | 10.5 | 13.0 | 13.0 | 12.0 | 12.9 | 10.6 | 14.0 | 11.5 | 14.8 | 14.4 |

TABLE I-continued

| Composition, phr | 1 | 2 | 3 | 4 | 5 | 6 | 7 | 8 | 9 | 10 | 11 |
|---|---|---|---|---|---|---|---|---|---|---|---|
| $M_H$-$M_L$, lbf-in | 36.3 | 20.5 | 34.3 | 36.0 | 41.0 | 7.9 | 26.6 | 26.0 | 33.7 | 31.5 | 35.3 |
| ts2, min. | 2.5 | 3.9 | 3.38 | 2.25 | 1.6 | 10 | 4.0 | 3.0 | 4.4 | 2.62 | 1.5 |
| t-50, min. | 5.3 | 9.5 | 7.2 | 4.8 | 2.8 | 17.5 | 13.9 | 11.2 | 13.2 | 5.8 | 3.2 |
| t-90, min. | 15.5 | 21.5 | 19.0 | 13.8 | 5.7 | 28.8 | 20.2 | 25.8 | 23.8 | 12.0 | 7.8 |
| Mh-60, lbf-in. | 51.5 | 34.0 | 51.0 | 50.3 | 53.2 | 33.0 | 38.5 | 50.2 | 48.6 | | |
| Mh-90, lbf-in. | | | | | | 35.6 | | 53.0 | | | |
| Tensile Properties: Cured 30' @ 160° C. | | | | | | | | | | | |
| Shore A | 62 | 60 | 62 | 62 | 62 | 60 | 60 | 63 | 62 | 60 | 60 |
| 100% Mod., Mpa | 2.212 | 1.741 | 2.143 | 2.205 | 2.104 | 1.518 | 2.187 | 2.874 | 2.875 | 2.060 | 1.873 |
| 300% Mod., Mpa | 10.111 | 8.393 | 10.059 | 9.647 | 8.270 | 3.196 | 9.611 | 11.387 | 11.215 | 11.638 | 10.582 |
| Tensile Str., Mpa | 12.582 | 13.379 | 12.915 | 12.181 | 10.934 | 4.107 | 12.588 | 13.400 | 13.283 | 13.670 | 13.537 |
| Elongation, % | 411 | 475 | 438 | 452 | 508 | 504 | 405 | 401 | 431 | 369 | 440 |
| Aged (168 hrs. @ 150° C.) Tensile Properties | | | | | | | | | | | |
| Shore A | 63 | 63 | 64 | 64 | 63 | 68 | 70 | 64 | 68 | 63 | 63 |
| 100% Mod., Mpa | 2.213 | 1.919 | 2.141 | 2.515 | 2.463 | 4.013 | 4.588 | 4.199 | 4.602 | 3.034 | 2.465 |
| 300% Mod., Mpa | 9.972 | 7.937 | 9.514 | 10.580 | 9.042 | | | | | | |
| Tensile Str., Mpa | 10.686 | 9.862 | 11.447 | 11.362 | 10.031 | 11.678 | 12.393 | 13.606 | 14.198 | 11.833 | 9.112 |
| Elongation, % | 314 | 378 | 361 | 324 | 339 | 223 | 216 | 246 | 254 | 260 | 259 |

Footnotes:
[1] SP 1045 denotes an alkyl phenol-formaldehyde resin of Schenectady Chemical Company
[2] Vultac 5 denotes as alkylated phenyl disulfide
[3] Tetrone A denotes dipentamethylene thiuram hexasulfide
[4] ZDEDC denotes zinc diethyl dithiocarbamate
[5] Zinc carbonate hydroxide is $5ZnO.2CO_3.4H_2O$
[6] TEG denotes triethylene glycol

TABLE II

Comparison of Vulcanization Systems Employing Either Zn Carbonate Hydroxide or Zinc Oxide

| Composition, phr | 1 | 2 | 3 | 4 | 5 | 6 | 7 | 8 | 9 | 10 | 11 |
|---|---|---|---|---|---|---|---|---|---|---|---|
| | % Change Relative to ZnO Compositions | | | | | | | | | | |
| Mooney Scorch @ 135° C. | | | | | | | | | | | |
| t-3 | 60 | 189 | 82 | 31 | >233 | | | 41 | | 92 | |
| t-5 | 60 | 206 | 100 | 28 | | | | 40 | | 93 | |
| t-10 | 78 | 248 | 113 | 37 | | | | 41 | | 96 | |
| Monsanto ODR | | | | | | | | | | | |
| Mh-30 | 7 | -42 | -11 | -8 | -44 | | | -12 | | -7 | |
| t-S2 | 56 | 144 | 112 | 44 | 150 | | | -31 | | 73 | |
| t-52 | 172 | 239 | 157 | 71 | 25 | | | -15 | | 81 | |
| t-90 | 172 | 277 | 233 | 142 | 42 | | | 8 | | 54 | |
| Mh-60 | 2 | -36 | -4 | -6 | -15 | | | 2 | | | |
| Tensile Properties - Original | | | | | | | | | | | |
| Shore A | 0 | 3 | 0 | 0 | 0 | | | 2 | 0 | | |
| Mod. @ 100% | 5 | -17 | 2 | 5 | -30 | | | 0 | | 10 | |
| Mod. @ 300% | 22 | -15 | 22 | 16 | -67 | | | 1 | 10 | | |
| Tensile Str. | 15 | 22 | 18 | 11 | -67 | | | 1 | | 1 | |
| Elongation | -19 | -6 | -14 | -11 | 25 | | | -7 | | -16 | |
| Tensile Properties - Aged | | | | | | | | | | | |
| Shore A | 0 | 0 | -2 | -2 | -3 | | | -6 | | 0 | |
| Mod. @ 100% | -10 | -22 | -13 | 2 | -12 | | | -9 | | 23 | |
| Mod. @ 300% | 10 | -12 | 5 | 17 | | | | | | | |
| Tensile Str. | 6 | -2 | 14 | 13 | -6 | | | -4 | | 29 | |
| Elgonation | -7 | 12 | 6 | -4 | -3 | | | -3 | 0 | | |

TABLE III

| Test | Test Method |
|---|---|
| Mooney Scorch | ASTM D-4818 |
| Hardness, Shore A | ASTM D-2240 |
| 100% Modulus | ASTM D-412 |
| 300% Modulus | ASTM D-412 |
| Tensile Strength | ASTM D-412 |
| Elongation, % | ASTM D-412 |
| Monsanto Oscillating Disc Cure Rheometer (ODR) | ASTM D-2084 |

What is claimed is:

1. A process for vulcanizing a halogen-containing copolymer of a C4 to C7 isomonoolefin and a para-alkylstyrene, which comprises the step of contacting said copolymer at vulcanization conditions with a vulcanization mixture comprising (a) a zinc compound selected from the group consisting essentially of basic zinc carbonate hydroxides being present in a molar ratio to said halogen-containing copolymer in a range of from about 0.05:1 to about 5:1, and (b) a component selected from the group consisting of a dialkyldithiocarbamate, a diaryldithiocarbamate, an alkyl thiuram sulfide, an aryl thiuram sulfide, a phenolformaldehyde resin, and mixtures thereof.

2. The process of claim 1, wherein said basic zinc carbonate hydroxide is selected from the group consisting of $5 ZnO.2CO_3.4H_2O$; $ZnCO_3.2Zn(OH)_2.H_2O$; $2 ZnCO_3.3Zn(OH)_2$ and mixtures thereof.

3. The process of claim 1, wherein said basic zinc carbonate hydroxide is $5 ZnO.2CO_3.4H_2O$.

4. The process of claim 1, wherein said basic zinc carbonate hydroxide is present in a molar ratio of said basic zinc carbonate hydroxide to said halogen-containing copolymer ranging from about 0.1:1 to about 1:1.

5. The process of claim 1, wherein said copolymer comprises from about 0.5 to about 20 weight % of said para-alkylstyrene.

6. The process of claim 1, wherein said halogen-containing copolymer comprises from an effective amount above zero to about 7.5 weight percent of said halogen.

7. The process of claim 1, wherein said halogen-containing copolymer comprises from about 0.1 to about 7.5 weight percent of said halogen.

8. The process of claim 1, wherein said halogen is selected from the group consisting of chlorine, bromine and mixtures thereof.

9. The process of claim 1, wherein said halogen is bromine.

10. The process of claim 1, wherein said isomonoolefin is isobutylene and said para-alkylstyrene is para-methylstyrene.

11. The process of claim 1, wherein said component (b) is present in an amount ranging from about 0.5 to about 10 weight parts per hundred parts of said halogen-containing copolymer.

* * * * *